(No Model.)
J. LINDLE.
Water Cooler and Refrigerator.
No. 240,523. Patented April 26, 1881.
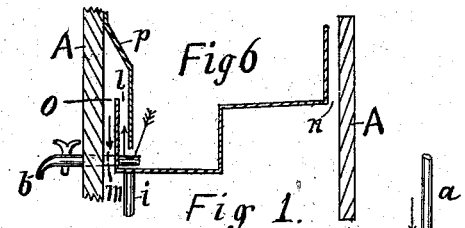
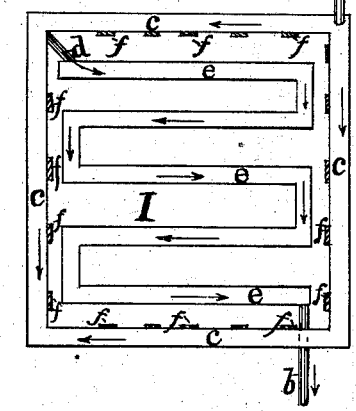
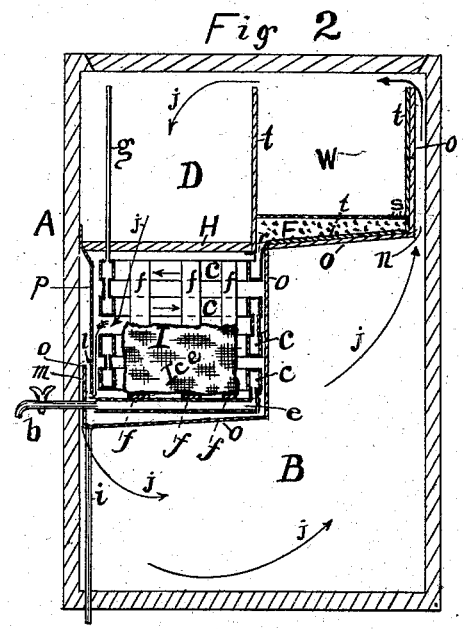
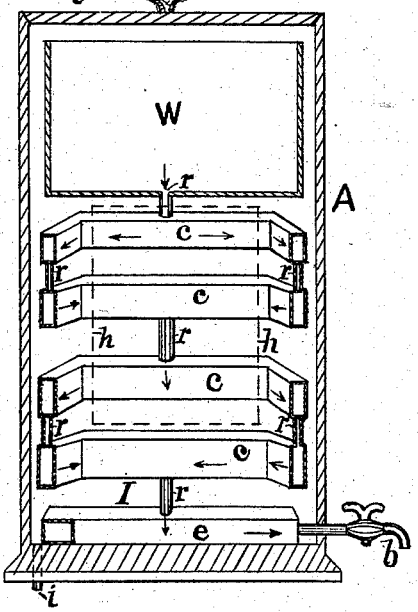
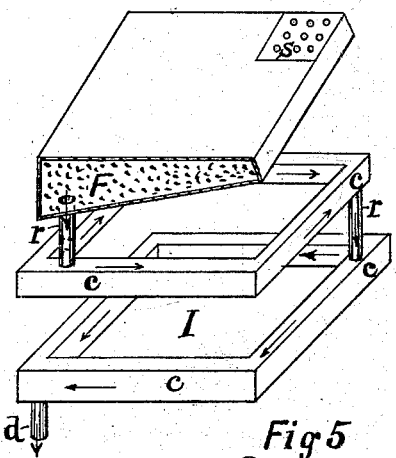
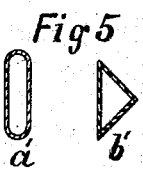
Witnesses.
Wm Hubbard
C. E. Stanley
Inventor
Joseph Lindle
By Wm Zimmerman
Atty

UNITED STATES PATENT OFFICE.

JOSEPH LINDLE, OF CHICAGO, ILLINOIS.

WATER-COOLER AND REFRIGERATOR.

SPECIFICATION forming part of Letters Patent No. 240,523, dated April 26, 1881.

Application filed July 21, 1880. (No model.)

*To all whom it may concern:*

Be it known that I, JOSEPH LINDLE, of Chicago, in the county of Cook and State of Illinois, have invented certain new and useful Improvements in Water-Coolers and Refrigerators; and I hereby declare the following to be a full, clear, and exact description thereof, which will enable others skilled in the art to which my invention appertains to make and use the same, reference being had to the accompanying drawings, forming a part thereof, and in which—

Figure 1 represents a plan view of the arrangement and connection of the pipes for cooling water. Fig. 2 represents a vertical cross-section of a combined water-cooler, refrigerator, and filter. Fig. 3 represents a vertical section of a water-cooler, showing, in partial perspective, a modification of the arrangement of the pipes necessary for such construction. Fig. 4 shows a perspective view of a water-filter and series of pipes shown in plan in Fig. 1, omitting the floor-pipes. Fig. 5 represents two end sections of pipes, shown as modifications of those represented in the other figures; and Fig. 6 represents the air-passages shown in Fig. 2 on an enlarged scale.

Like letters of reference indicate like parts.

My invention relates to that class of water-coolers in which the water is conducted in pipes around the ice; and it also consists in giving the water-pipes so used a specially constructed form, which will produce better results than an ordinary round pipe.

My invention further consists in so combining with the water-cooler a refrigerating-chamber, water-tank, and filter, so as to receive the fullest possible benefit from a given quantity of ice, and to attain these desirable ends I construct the necessary parts as follows, namely:

Around the vertical sides of any suitable chamber, constructed in the usual way for the purpose of excluding as much as possible the external temperature, I place a series of pipes, *c*, conforming to the chamber, (here shown square,) each pipe forming a ring by itself, and connect them together at diagonally-opposite corners by means of vertical pipes *r*, and connect the last or bottom ring of the series by means of a pipe, *d*, with the floor-pipes *e*, passing back and forth on the bottom of the ice-chamber I. To the outer end of the floor-pipe I connect a discharge-pipe or faucet, *b*.

To strengthen and protect the pipes from injury, and also to hold them securely in position, I solder to them flat strips of zinc or galvanized iron, *f*, the pipes *c* being also made of sheet-zinc, galvanized iron, or other like thin material.

The pipes, as shown, are rectangular and oblong in cross-section, presenting one of their largest flat sides to the ice. The end thus attained is a greater refrigerating-surface than would be possible if the end sections of these pipes were round, as thereby the ice would touch the pipes at only a comparatively small surface, and as a consequence the cooling of the water flowing in the pipes would be less complete, slower, and consequently more expensive.

Other forms of pipe may be used, as suggested in Fig. 5, where $a'$ represents an oval and $b'$ a triangular cross-section, which would of course be used, as shown, with the greatest flat side to the ice.

When the object is simply to cool the water flowing through the pipes, I connect an inclosed series of pipes, *c e*, of required dimensions, as shown in Fig. 2, with a hydrant or reservoir, by means of a pipe, *a*, and charge the ice-chamber I with ice and carefully regulate the flow of water to the required quantity. By this means I can obtain a stream of rapidly and thoroughly cooled water at the faucet *b*. When desired, a filter, F, may be attached, which admits the water through a screen, *s*, after which it passes down a pipe, *r*, into the first ring *c* of pipes, where it divides and passes to the right and left, as shown by the arrows, into the diagonally-opposite corner of the first ring *c*, and there passes through another vertical pipe, *r*, into the next ring below, where it goes through the same process as just described, and so on to the bottom of the last ring *c* of the series, where it is connected to the bottom series or floor-pipe, *e*, by a connecting-pipe, *d*, the other end of which has a discharge-pipe, *b*, which may lead to any desired part of the house, or from whence it may be drawn directly by a faucet.

When it is desired to use my system of pipes for cooling water in a tank, as shown in Fig.

3, the arrangement above described will have to be modified slightly on account of the door $h$, (shown in dotted outline,) which to admit the ice has to be put on the side of the tank A. The water from the reservoir W passes down through the pipe $r$ into the pipe $c$, where it divides to the right and left, flowing through to the ends of the pipe $c$, and thence down the vertical pipes $r$ at its ends into the next pipe below, from whence the currents formed at the end of the pipe by the pipe being thus charged flow toward its center, where they find an outlet into the next pipe below through another pipe, $r$, and so on through the series, as is fully indicated by the arrows, until it reaches the bottom, where a series of pipes or floor-pipes, $e$, (shown in Fig. 1,) may be used, and from which the water may be drawn at $b$.

A filter, F, may be placed under the water-tank when desired.

By arranging the pipes for the water-cooler as just described above, I am enabled to have one side of the chamber clear, to admit of a door, $h$, through which the chamber I is replenished with ice. A drip-pipe, $i$, conducts away the water of the melting ice.

In order to fully obtain all the cooling effects in the most economical manner from a given quantity of ice, I incase the pipes, as arranged in Figs. 1 and 4, in a box, A, Fig. 2, resting them on a partition of zinc or galvanized iron, $o$, which begins near the top of the box A, and is so placed as to leave an air-space, $n$, between it and the wall of the box. This air-space $n$ is made deep enough to form the side of a water-tank, W, and filter F, of sufficient depth, at which point the said sheet $o$ is brought forward far enough to form the width of the bottom of the water-tank W. From thence it again descends vertically into the chamber B, of sufficient depth to form the ice-receptacle I, containing the series of pipes $c$ $e$, and then passes forward to the front of the chamber B, forming the bottom of the ice-chamber I, after which it rises a few inches, terminating at $o$, thus forming a water-tank for the water from the melting ice, and so as to leave a narrow space, $m$, between it and the front wall of the box A.

To the front wall of the box A, and at about the bottom of the chamber D, is fastened a sheet of metal, $p$, which drops down and forms an apron over the upward-projecting front portion of the sheet $o$, so placed as to form an air-space, $l$, and to the bottom of the chamber I, through $o$, is passed a pipe, $i$, for discharging the drip from the melting ice.

The object of the passages $l$, $m$, and $n$ is to give the inclosed air the necessary circulation, so as to keep it sweet and pure, and so as to keep all parts of the refrigerator of equal temperature.

The arrows $j$ show the course of the air-currents. The cold air as it becomes warmed rises from the bottom, passes through $n$, over the tank W, and down through the grating H, forming the bottom of the chamber D, thence through the ice-chamber I, where it discharges all the moisture and impurities carried with it from the storing-chambers B and D, after which it passes down through the space $m$, and now pure, dry, and cold back into the chamber B, and so on.

The sheets of metal $o$ and $p$ just described are preferably passed through the whole length of the box A, and are fastened to its ends. An open pipe, $g$, is connected to the top ring, $c$, so as to prevent the retarding of the flow of water at $b$ in case a vacuum should form in the pipes $c$. The pipes $c$, as shown in Figs. 2 and 3, together with the water-tank and filter, are set into their chambers loosely, from which they may at any time be removed by simply removing the faucet $b$, for the purpose of cleansing them.

Having thus described my invention, what I claim as new, and desire to secure by Letters Patent, is—

1. A water-cooler provided with a series of rings of flat-sided pipes, $c$, so arranged as to form a double water-current in each pipe or ring, and which currents alternately meet and separate as they flow from one ring into another, substantially as and for the purpose as herein set forth.

2. A water-cooler provided with a series of rings of flat-sided pipes so arranged as to form a double water-current in each pipe or ring, and which currents alternately meet and separate, in combination with the flat-sided cooling-coil or floor-pipe $e$, substantially as and for the purpose as herein shown and described.

3. A water-cooler consisting of a series of pipes, $c$, so arranged as to form a double or divided water-current flowing in opposite directions in each alternate pipe or ring, and connected to a coil at the base, and all united and stayed together by the flat metal strips $f$, substantially as and for the purpose as herein shown and described.

4. A water-cooler and refrigerator combined, consisting of the water-tank W, chamber D, grating H, ice-chamber I, provided with flat-sided cooling-pipes $c$ and $e$, and chamber B, all arranged substantially as and for the purpose as herein shown and described.

5. A water-cooler and refrigerator combined, consisting of the water-tank W, chamber D, grating H, ice-chamber I, provided with flat water-cooling pipes $c$ and $e$, chamber B, apron $p$, metal partition $o$, air-passages $l$, $m$, and $n$, and drip-pipe $i$, all constructed and arranged substantially as herein shown and described.

JOSEPH LINDLE.

Witnesses:
CHARLES MODIN,
CHAS. E. YOUNGBERG.